United States Patent [19]
Ficht et al.

[11] Patent Number: 4,512,290
[45] Date of Patent: Apr. 23, 1985

[54] CRANK GUIDE ASSEMBLY FOR INTERNAL COMBUSTION ENGINES, IN PARTICULAR TWO-STROKE INTERNAL COMBUSTION ENGINES WITH FACING CYLINDERS

[75] Inventors: Reinhold Ficht, Kirchseeon; Manfred Schindler, Markt Schwaben, both of Fed. Rep. of Germany

[73] Assignee: Ficht GmbH, Kirchseeon, Fed. Rep. of Germany

[21] Appl. No.: 494,767

[22] Filed: May 13, 1983

[30] Foreign Application Priority Data

May 14, 1982 [DE]  Fed. Rep. of Germany ....... 3218311

[51] Int. Cl.³ .............................................. F02B 75/32
[52] U.S. Cl. .......................... 123/56 BC; 123/197 AC
[58] Field of Search ............. 308/DIG. 8; 123/197 A, 123/197 AC, 197 AB, 197 R, 56 R, 56 A, 56 AC, 56 B, 56 BC, 56 C, 55 AA, 55 A

[56] References Cited

U.S. PATENT DOCUMENTS

| | | | |
|---|---|---|---|
| 1,875,838 | 9/1932 | Winckler | 123/56 AC |
| 2,696,413 | 12/1954 | Wheildon | 308/DIG. 8 |
| 3,938,868 | 2/1976 | Vanwyk | 308/DIG. 8 |
| 4,013,048 | 3/1977 | Reitz | 123/56 BC |
| 4,331,108 | 5/1982 | Collins | 123/56 C |

*Primary Examiner*—Craig R. Feinberg
*Assistant Examiner*—David A. Okonsky
*Attorney, Agent, or Firm*—Toren, McGeady and Stanger

[57] ABSTRACT

In a two-stroke internal combustion engine with facing cylinders, piston rods extend from the cylinders into a central crank guide located within a crankcase. A crankpin is located within the crankcase and a sliding piece forms the bearing points between the crankpin and the crank guide. The sliding piece is made up of solid or laminated ceramic components so that the friction heat can be removed using the water from the engine cooling circuit.

4 Claims, 8 Drawing Figures

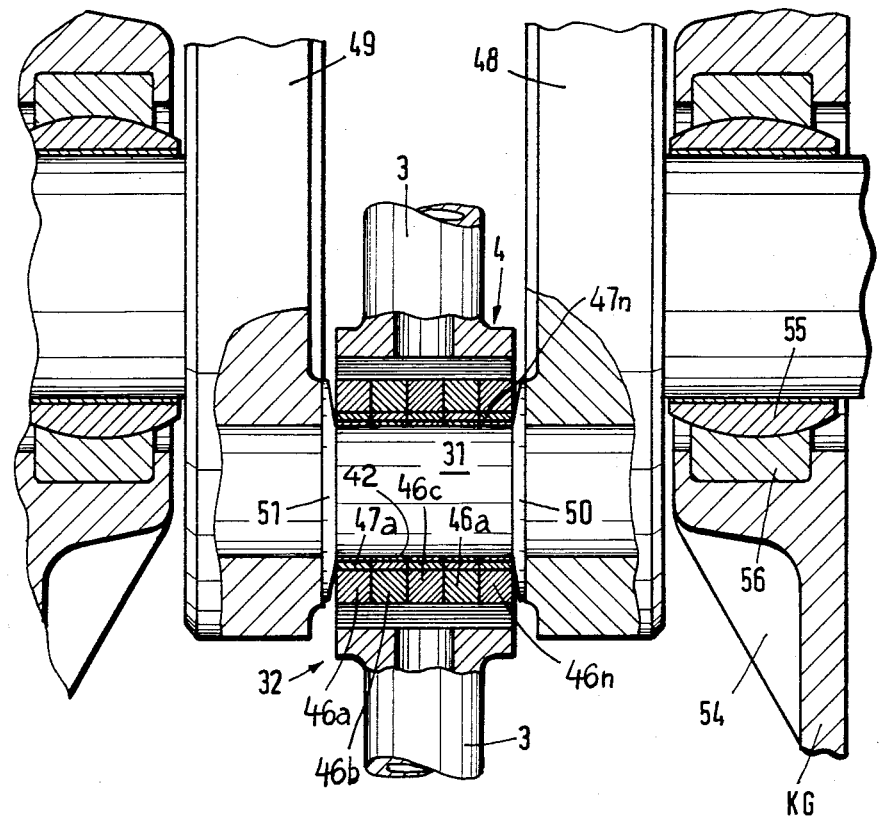
Fig. 6
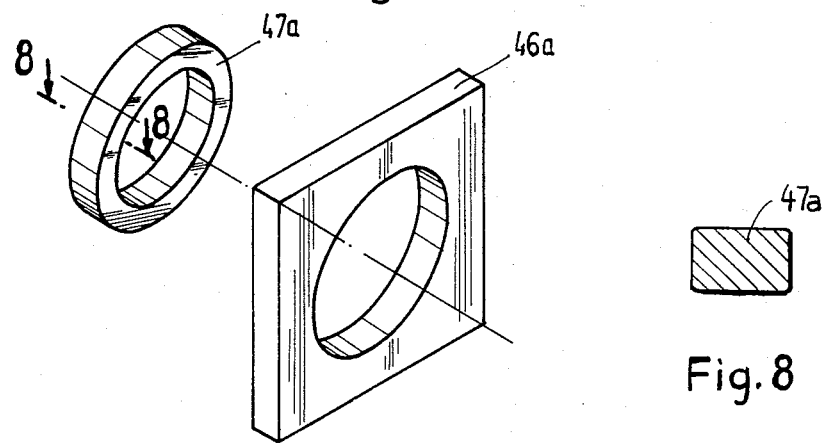
Fig. 7
Fig. 8

CRANK GUIDE ASSEMBLY FOR INTERNAL COMBUSTION ENGINES, IN PARTICULAR TWO-STROKE INTERNAL COMBUSTION ENGINES WITH FACING CYLINDERS

SUMMARY OF THE INVENTION

The present invention is directed to a crank guide assembly for use with internal combustion engines, such as two-stroke internal combustion engines, where the engine includes a pair of oppositely disposed cylinders including coaxially arranged piston rods each attached to a piston in a different one of the cylinders. A crankcase is located between the piston rod and is sealed with respect to the cylinders. The crank guide assembly is located within the crankcase and includes a sliding piece forming the bearing points between the crankpin and the crank guide. A crank guide assembly of this general type is disclosed in German Pat. No. 409 919.

Although the advantages with regard to quiet running and service life of such an assembly, working without so-called mixed lubrication and known as opposed cylinder-type engines in the case of two-stroke combustion engines, are immediately apparent, such an assembly has not been used in practice for a number of reasons. As the low-boiling hydrocarbons obtained from fossil fuels have become scarce and expensive and have been replaced by fuels obtained from non-fossil sources, increased importance has been attached to two-stroke engines due to their higher useful stroke ratio as compared with four-stroke engines, despite their lower thermal efficiency. Apart from alcohols, such non-fossil fuels are, in particular, fermentation gases with a considerable methane proportion—70% $CH_4$, 30% $CO_2$,—with the fermentation gases being obtained in microbial processes from organic materials and in the absence of oxygen. As the combustion heat of methane is only 8450 $kcal/m^3$ and the waste gases obtained during combustion are damaging to the environment, two-stroke internal combustion engines offer considerable advantages as compared to four-stroke internal combustion engines with respect to the necessary energy conversion.

Experience has indicated that fermentation gases cannot be burned in conventional engines without special precautions being taken, since among other reasons, as mixed gases, they contain constituents which are corrosive to metals. In addition, oil lubrication causes difficulties in two-stroke internal combustion engines and this fact has caused the almost complete disappearance from the market of two-stroke engines, apart from stationary engines and those used in light motorcycles. As is known, without incurring considerable expenditure when operating such engines, it is not possible to prevent lubricating oil from entering the combustion chambers of the cylinders and being discharged via the exhaust as environment-polluting combustion residues and, on the other hand, to prevent such combustion gases from entering the lubricating oil-filled crankcases and diluting the lubrication to an unacceptable level.

Therefore, the primary object of the present invention is to provide a crank guide assembly for a two-stroke internal combustion engine of the type mentioned above which enables engine operation without oil lubrication. This problem is solved by utilizing a sliding piece forming the bearing surfaces between the crankpin and the crank guide formed of ceramic components. Further features of the invention are set forth in the claims.

In accordance with the present invention, the bearing points or surfaces required in a crank guide assembly are formed of ceramic components which, in a first embodiment of the invention, are made up in a solid or laminated manner and in the vicinity of the bearing surfaces are provided with a domed or convex-concave configuration in the manner of self-adjusting bearings with a split construction. In a second embodiment of the invention, however, a plurality of aligned discs are provided for each bearing support and are held in their predetermined position by suitable components, such as spring lock washers. The solid or laminated bearing component associated with the metal-part of the crank guide assembly to be supported, that is, the component is bonded onto the metal part by an elastic means so that relative rotation is prevented. In a known manner the prevention of rotation can be effected with the aid of a tooth system. Each sliding piece is made up of two geometrically identical parts which, in the junction plane, have an air gap of 0.5 to 0.8 mm. The sliding surfaces of the crank guide associated with the bearing part are also made up of a ceramic material in the form of flat ceramic discs and are fixed to the corresponding bearing surfaces of the crank guide by means of a glued or clamped joint.

Such a construction of the bearing points or surfaces offers the important advantage that the bearing points have excellent characteristics, without using a lubricant and even at high temperatures. The heat at the bearing points can be removed by water and such water simultaneously reduces the friction coefficients at the ceramic—ceramic interfaces so that the cooling water circulation, present in a water-cooled engine, can be used for removing the bearing heat. Further, such an arrangement leads to the elimination of all of the problems caused by the entry of lubricating oil into the combustion area, as well as the entry of combustion gas into the crankcase. Another advantage where engines are running at low speed, at least for short operating periods, is that there is no need for heat removal means, because the ceramic components have excellent anti-friction characteristics. By securing the ceramic ring on the crankpin with the aid of an adhesive elastic mass, the unavoidable operational bending effects of the crankpin with respect to the inelastic ceramic are compensated. The domed or convexly-concavely curved construction of the bearing parts compensates the bearing effects at right angles to the direction of movement of the piston rods. This also compensates for bearing tolerances so that the ceramic components cannot be destroyed by stress concentrations produced by load reversals.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 6 is a sectional view through another embodiment of the present invention;

FIG. 7 is a detail of a portion of the assembly shown in FIG. 6 in an exploded perspective view; and FIG. 8 is a sectional view through the ring 47a.

DETAIL DESCRIPTION OF THE INVENTION

Figure 1:
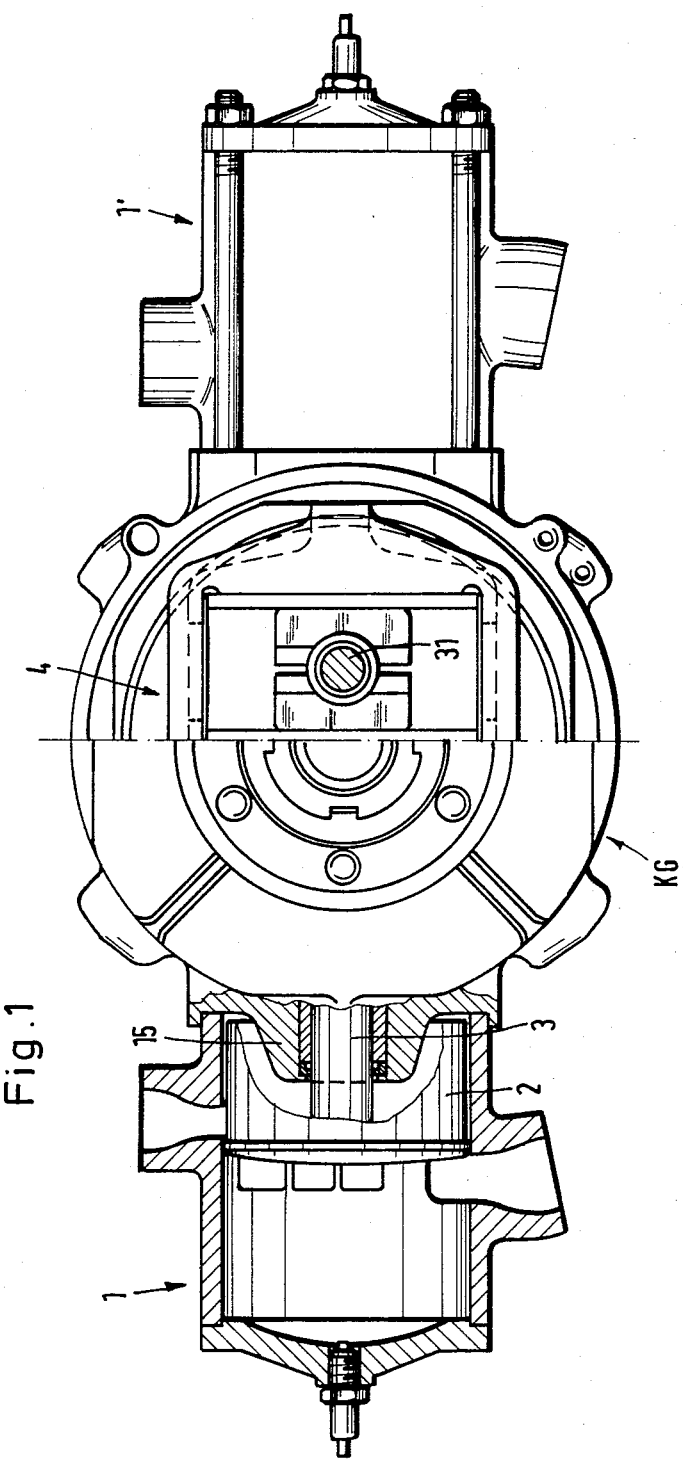
FIG. 1 is a front view, partly in section, of a twin-cylinder two-stroke gasoline engine.

The mechanical construction of the two-stroke engine in the form of a co-called opposed cylinder-type engine as illustrated in FIG. 1, includes two oppositely disposed and facing, coaxially arranged cylinders 1, 1' with the working pistons 2 in the cylinders reciprocating in a linear direction. Each working piston 2 is connected to a piston rod 3 which also performs linear reciprocating movements. The ends of the piston rods projecting from the cylinders are articulated to a centrally positioned, rotating crank mechanism 4 which converts the linear reciprocating movements into a rotary movement. The crank mechanism 4 is housed in a crankcase KG with the cylinders 1, 1' fixed to the crankcase by partitions 15.

Figure 2:
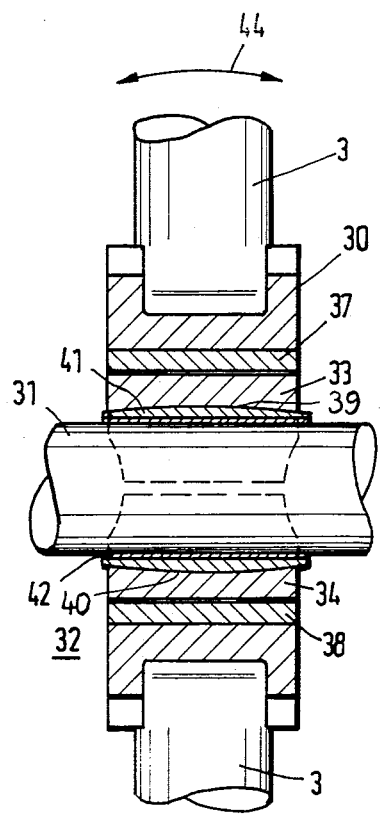
FIG. 2 is an enlarged cross-sectional view through the crank mechanism of the engine shown in FIG. 1.
Figure 3:
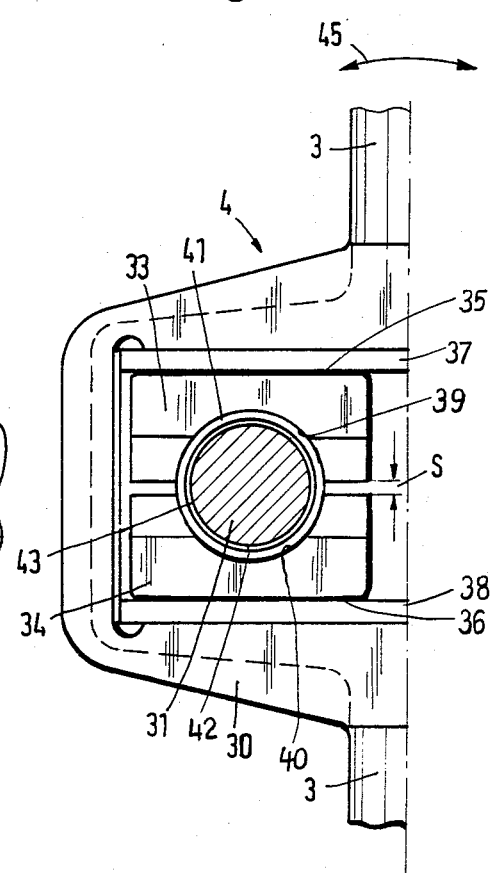
FIG. 3 is a side view of the crank mechanism illustrated in FIG. 1.
Figure 4:
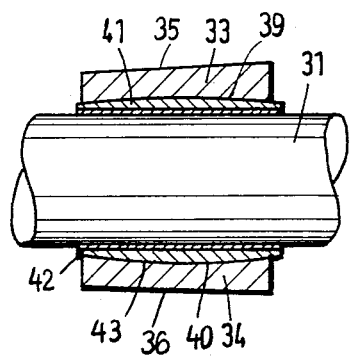
FIG. 4 is a sectional view illustrating the bearing parts of the crank mechanism in FIG. 3 with the crankpin tilted with respect to the perpendicular.
Figure 5:
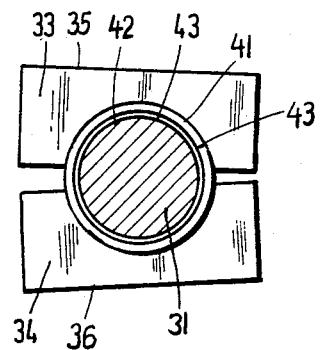
FIG. 5 is a side view of the tilted arrangement shown in FIG. 4.

In FIG. 2 the piston rods 3 are connected to the crank mechanism 4 and their facing ends are secured to the juxtaposed longitudinal sides of a crank guide 30. A crankpin 31 is guided within the crank guide 30 and a sliding piece 32 is positioned between the crankpin and the crank guide.

According to a first embodiment of the invention, as illustrated in FIGS. 2 to 5, the sliding piece 32 is formed of two geometrically identically constructed outer halves 33, 34. A junction plane is provided between the two halves forming an gap S of 0.5 to 0.8 mm. Ceramic discs 37, 38, serving as slide rails, parallel to the inner long sides of the crank guide, are associated with the outer faces 35, 36 of the outer halves 33, 34 of the sliding piece 32. A sliding ring 41, whose width corresponds to that of the sliding piece halves is associated with the inner circumferential surfaces 39, 40 which, in turn, are associated with the outer cylindrical circumferential surface of the crankpin 31. Slide ring 41 is fixed to the surface of the crankpin by an elastic adhesive layer 42. The associated sliding bearing surfaces of the slide ring 41 and the sliding piece 32, that is the surfaces which slide on one another, and are designated by reference numeral 43, are domed with respect to the long axis of the crankpin 31, that is they are constructed in a self-adjusting manner as can be seen in FIG. 2. The domed surfaces are arranged so that one surface is convexly shaped and the other surface is concavely shaped. Thus, movements of the crank guide in the direction of the double arrow 44 are compensated. All of the other surfaces are flat. The edges of the sliding piece 32 in the direction of the double arrow 44 are rounded which favors a wedge formation of the water which, optionally, can be used as the lubricant.

In the second embodiment of the invention as shown in FIGS. 6 and 7, the sliding piece 32 located between the crank guide and the crankpin is formed of a laminated construction of ceramic components. Accordingly, sliding piece 32 is made up of several discs 46a to 46n which have a rectangular outer shape, note FIG. 7, and are approximately 3 mm wide ceramic platelets with rounded corners. These rounded corners prevent stress concentrations caused by load reversals within the ceramic components. Discs 46a to 46n are mounted and run on ceramic rings 47a to 47n of equal width with the discs, and the rings are arranged side-by-side on crankpin 31, note FIG. 6.

In the case of deflections of the crankpin, the individual discs can be straightened in accordance with the circumstances. Accordingly, any bending stresses in the crankpin are divided up into small individual bending stresses and are absorbed as purely compressive forces by the individual discs. To prevent uncontrolled tilting of the discs, spring lock washers 50, 51 are placed between the opposite end of the discs and the crank webs 48, 49.

Due to the higher friction coefficient between steel/ceramic and ceramic/ceramic, it is ensured that the ceramic rings turn on the crankpin. Protection against torsion, however, can also be provided in such a way that the ceramic rings 47a to 47n are adhered by an elastic means to the crankpin in the same manner as in the first embodiment. The ceramic rings 47a to 47n and the associated crankpin can be provided in a known manner with involute teeth or splines which prevent a relative rotation between the ceramic rings and the crankpin. It can be appreciated that any other known form of teeth can be used. It must be ensured, however, that such teeth are shaped so that no notch effects can occur in the ceramic elements.

Finally, it can be noted from FIG. 6 that the crankpin 31 with the crank webs 48, 49 is mounted in walls 54 of the crankcase KG, with the aid of ceramic sliding bearings 55, 56. These ceramic sliding bearings can either be solid as in the embodiment in FIGS. 2 to 5, or laminated as in the embodiment of FIGS. 6 and 7.

While specific embodiments of the invention have been shown and described in detail to illustrate the application of the inventive principles, it will be understood that the invention may be embodied otherwise without departing from such principles.

We claim:

1. Crank guide assembly for use with internal combustion engines, such as two-stroke internal combustion engines, with the engine including a pair of oppositely disposed cylinders in coaxial alignment each having a piston rod attached to a piston in the cylinder with the piston rod extending out of the cylinder, a crankcase sealed with respect to the cylinders with the piston rods extending into the crankcase, said crank guide assembly comprises a crankpin rotatably mounted in the crankcase, a crank guide located within the crankcase connected to said piston rod and extending around said crankpin, a sliding piece mounted on said crankpin and sliding in said crank guide, said sliding piece forming the bearing surfaces between said crankpin and said crank guide and said sliding piece comprises ceramic components which slide on one another, said ceramic components comprise a plurality of ceramic rings each closely encircling said crankpin and a corresponding number of ceramic discs encircling said ceramic rings, a pair of ceramic platelets are located between said crank guide and said ceramic components located around said crankpin, said ceramic platelets having a width corresponding to the dimension of said crank guide in the axial direction of said crankpin, and a clamped joint connecting said ceramic platelets to said crank guide.

2. Crank guide assembly for use with internal combustion enginges such as two-stroke internal combustion engines, with the engine including a pair of oppositely disposed cylinders in coaxial alignment each having a piston rod attached to a piston in the cylinder with the piston rod extending out of the cylinder, a crankcase sealed with respect to the cylinders with the piston rods extending into the crankcase, said crank guide assembly comprises a crankpin rotatably mounted in the crankcase, a crank guide located within the crankcase connected to said piston rod and extending around said crankpin, a sliding piece mounted on said crankpin and sliding in said crank guide, said sliding piece forming the bearing surfaces between said crankpin and said crank guide and said sliding piece comprises ceramic components which slide on one another, said ceramic components comprise a plurality of ceramic rings each closely encircling said crankpin and a corresponding number of ceramic discs encircling said ceramic rings, said ceramic rings each fit within one of said ceramic discs with each said ceramic ring corresponding in width to the corresponding said ceramic disc, crank webs spaced apart in the axial direction of said crankpin, said ceramic rings and ceramic discs located between said crank webs, and a leaf spring located between and in contact with each said crank web and the adjacent end of said ceramic rings and ceramic discs.

3. Crank guide assembly, as set forth in claim 1 or 2, wherein said ceramic components are constructed as self-adjusting domed ceramic components, at least one of said plurality of ceramic rings is secured to said crankpin by an elastic adhesive layer, said ceramic components radially outwardly embracing said ring are in the form of two geometrically identically constructed sliding piece halves with a junction plane formed between said halves defining an air gap having a width of 0.5 to 0.8 mm.

4. Crank guide assembly, as set forth in claim 1 or 2, wherein bearings are spaced apart within said crankcase in the axial direction of said crankpin and support said crankpin, and said crankpin supporting bearings comprise ceramic sleeves.

* * * * *